United States Patent [19]

Chaum

[11] Patent Number: 5,276,736
[45] Date of Patent: * Jan. 4, 1994

[54] OPTIONALLY MODERATED TRANSACTION SYSTEMS

[76] Inventor: David Chaum, 14652 Sutton St., Sherman Oaks, Calif. 91403

[*] Notice: The portion of the term of this patent subsequent to Jul. 14, 2009 has been disclaimed.

[21] Appl. No.: 912,193

[22] Filed: Jul. 13, 1992

Related U.S. Application Data

[63] Continuation of Ser. No. 609,519, Nov. 5, 1990, Pat. No. 5,131,039.

[30] Foreign Application Priority Data

Jan. 29, 1990 [EP] European Pat. Off. ......... 90200207.0

[51] Int. Cl.$^5$ .................. H04k 1/00; H04L 9/02; H04L 9/00
[52] U.S. Cl. ......................... 380/24; 380/25; 380/49
[58] Field of Search ............... 380/23, 25, 49, 24

[56] References Cited

U.S. PATENT DOCUMENTS

| | | | |
|---|---|---|---|
| 4,123,747 | 10/1978 | Lancto et al. | 380/29 |
| 4,797,928 | 1/1989 | Dykes | 380/49 |
| 4,926,480 | 5/1990 | Chaum | 380/23 |

Primary Examiner—Stephen C. Buczinski
Attorney, Agent, or Firm—Nixon & Vanderhye

[57] ABSTRACT

A tamper-resistant part is disclosed that can conduct transactions with an external system through a moderating user-controlled computer or that can on other occasions be brought into direct connection with the external system. In the moderated configuration, the moderating computer is able to ensure that certain transactions with the external system are unlinkable to each other. In the unmoderated configuration the tamper-resistant part can also ensure the unlinkability of certain transactions. Also testing configurations are disclosed that allow improper functioning of the tamper-resistant part, such as that which could link transactions, to be detected by user-controlled equipment. Another testing configuration can detect improper functioning of an external system that could, for instance, obtain linking information from a tamper-resistant part.

8 Claims, 7 Drawing Sheets

Fig. 4
BALANCE INCREASING PROTOCOL

Fig. 5
REQUEST BALANCE INCREASE PROTOCOL

Fig. 9
FAST AUTHENTICATION PROTOCOL

OPTIONALLY MODERATED TRANSACTION SYSTEMS

This is a continuation of application Ser. No. 07/609,519, filed Nov. 5, 1990, now U.S. Pat. No. 5,131,039.

BACKGROUND OF THE INVENTION

1. Field of the Invention

This invention relates to secure and privacy protecting transaction systems, and more specifically to cryptographic configurations including value transfers between pairs of subsystems optionally moderated by a third subsystem.

2. Description of Prior Art

Reference is hereby made to P.C.T. publication WO 89/11762 and U.S. Ser. No. 198,315 filed May 24, 1988 titled "Card-computer moderated systems," by the present applicant, which are incorporated herein by reference. The approach taken there, when applied to consumer payments, might suggest a hand-held personal computer configured to include an independent tamper resistant part, and that tamper-resistant part might take the form of a "smart card."

Reference is also hereby made to P.C.T. publication WO 89/08957 and U.S. Ser. No. 168,802 filed Mar. 16, 1988, titled "One-show blind signature systems," by the present applicant, which are incorporated herein by reference. An approach to consumer payment transactions is taken there that does not require a tamper-resistant device to be held by the payer.

In the context of some consumer payment applications, straightforward adoption of the exemplary embodiments of the above two references leaves room for improvement.

In the approach of the first reference cited above, the previously disclosed exemplary embodiments would require that the card computer and/or the tamper-resistant device make cryptographic-transformations during transactions with an external system. Furthermore, these "while-you-wait" computations, as well as other preparatory computations, would make extensive use of public-key cryptographic techniques, which would be impracticably slow with today's smart cards.

The approach of the second reference above may require quite large messages if its "check" feature is not used; but using that feature means that consumers must conduct refund transactions to recover unspent value, and such unspendable pre-payment may not be attractive to consumers. The approach as a whole, moreover, protects against dishonest consumers only by "accountability-after-the-fact" as opposed to "prior-restraint."

A third approach is the obvious one of applying conventional cryptographic techniques in a smart card that communicates directly with an external system. This does have the advantage of allowing transactions without a moderating card computer, although lack of user trusted mechanisms means that users are unable control transactions, but the transactions may be to some degree monitorable after the fact. A challenge would be provided to the card at the time of payment to indicate the amount of payment and prevent "replay" attacks. The card would return the result of a cryptographic transformation using a conventional key also known to the external system and including the challenge as a parameter. Although all cryptography would be of the conventional type, which is today significantly faster than public key, it would still be while-you-wait.

More fundamental problems with this third approach for general use come from the choice of which keys are available at which locations. If each card has the identical key, then some organized effort that succeeds in obtaining this secret by opening a single card could counterfeit or impersonate cards on a wholesale basis. On the other hand, if cards were to have unique keys, then all transactions involving a particular card could be linked together and the holder's privacy would thus be compromised. Because in any variant of this approach each potential off-line point of payment must have access to keys of all cards, compromise of any one such point would also allow widespread impersonation or counterfeiting.

OBJECTS OF THE INVENTION

Accordingly, it is an object of the present invention to:

prevent substantial abuse, even if some tamper-proof cards are opened and even if some points of off-line payment are fully compromised;

allow the tamper-resistant part to permit consumers to spend all value stored in the equipment they hold, yet restrain them from spending more;

allow consumer-held, non-tamper-resistant equipment to ensure, with substantial probability, that payments by the holder cannot be linked together;

make such consumer held equipment optional in the conducting of transactions;

not require any cryptographic computations by user-held equipment during payment or other transactions;

require only quite modest amounts of public key cryptographic computation by the consumer-held equipment only for authentication; and to allow efficient, economical, and practical apparatus and methods fulfilling the other objects of the invention.

Other objects, features, and advantages of the present invention will be appreciated when the present description and appended claims are read in conjunction with the drawing figures.

BRIEF SUMMARY OF THE INVENTION

In accordance with the forgoing and other objects of the present invention, a brief summary of some exemplary embodiments will now be presented. Some simplification and omissions may be made in this summary, which is intended to highlight and introduce some aspects of the present invention, but not to limit its scope in any way. Detailed descriptions of preferred exemplary embodiments adequate to allow those of ordinary skill in the art to make and use the inventive concepts are provided later.

The setup of the moderated embodiment is much as in the first reference cited above: there is a tamper-resistant part T connected to one side of a moderating card computer C held by an individual. The other side of C communicates with a value issuing system Z and later with one or more value requesting systems, individually and collectively called W. More concretely, for instance, T might be a smart card or on-board security microprocessor, C a computer with transceiver installed in a motor vehicle, Z a road-use fee collecting agency, and W a local computer system communicating with vehicles traveling along certain segments of roadway. Another example might be an off-line point-of-sale payment.

Cryptographically, each payment transaction involves C issuing to W a distinct digital signature it obtained during a withdrawal transaction performed earlier with Z. To prevent a single signature form being accepted in more than one payment transaction, W issues a "challenge" and requires a satisfactory response before accepting the payment (Because the challenge can include other information, such as the amount of payment, T is also able to monitor these details.) In response, C sends a set of pre-images, under a public one-way function, of images that are contained in the signed message. Although C does know the signature and the images, C can only learn the corresponding pre-images from T.

By controlling which subsets of pre-images are released, T can prevent payment signatures from being re-used. Only some subsets of pre-images should be revealed by T; if T were, for some reason, to reveal all the pre-images for a particular candidate, then C could answer any challenge for it and spend it in any way with all W. Optimally, each valid subset of pre-images contains no valid proper subset. A simple way to achieve this would be to require that each challenge be the concatenation of a binary string and its complement. A more efficient example way to obtain the same property, however, is for the last bits, say, of the challenge string to be required to encode in binary the number of zero bits in the rest of the challenge.

The signatures containing the images must be established in a way that ensures cooperation of T is necessary to obtain the pre-images, but care must also be taken to ensure that C can protect the unlinkability of its payments. To accomplish these apparently conflicting objectives, T and C cooperate in a preparation phase during which they establish a mutually acceptable candidate message to be signed by Z. First T commits to the secret used to form its input to a candidate. Then C provides a random "pad" that serves to hide any information T might have tried to conceal in its secret contribution. After incorporating the pad into the pre-images, T computes and reveals the images to C. After this C can ask for the original commitment by T to be opened, which reveals all the pre-images. This can be provided by T—so long as T can ensure that the candidate never yields a digital signature as a result of a withdrawal transaction. In this way, C can check what T provides as images under the one-way function.

To establish the blinding factor for a candidate: T commits to a value; C provides a value to T; T opens the commitment to C; C checks the commitment; and then both T and C determine that the blinding factor is the cube of the sum of their respective contributions, in the multiplicative group modulo a public, system-wide, public-key, composite issued by Z.

In the withdrawal transaction, C selects a candidate and obtains a corresponding conventional cryptographic authenticator from T. The candidate is sent to Z, who independently computes this authenticator with the secret key used by the particular T in forming the authenticator. Then Z provides C with the third root of the blinded candidate added to the authenticator, which C is able to sue only because C can subtract the authenticator out to obtain the root.

Also typically during withdrawal, some form of payment will be supplied by the holder of T. The result should be that the balance T maintains is increased to reflect this new pre-payment. If an authenticator created by Z using the secret key shared with T were simply provided directly to T, then there might be some "in flow" of additional information to T. To prevent this, first T must commit by sending a one-way function of the authenticator to C. When Z provides the authenticator, this allows C to check, before giving it to T, that it has the value committed to.

So that no computation is needed by T in making a payment, T may pre-compute and store the full collection of pre-images related to a particular check. Thus, during payment T merely has to test that the challenge is properly formed and then supply the selected pre-images from memory.

A variation of the payment protocol is believed capable of preventing "mirror" attack, where a remote payer R is victimized by a payer N near W. In such an attack, each message sent by W is forwarded by N to R; each reply by R is relayed to W by N. The solution is based on making it impractical for N to pass messages from W to R and get the result back to W in time, to achieve this, certain commitment bits are supplied by C to W. Then W sends a bit of the challenge and expects to receive a bit of the value committed to almost simultaneously. This might be repeated for a number of bits synchronously. It is believed that is N is unable to transfer messages fast enough, any strategy for N to modify or anticipate messages will create a mismatch between the challenges C will respond to and that which W expects.

A generic conventional authentication protocol is shown in which a commit is initially given and the challenge selects among the bits of the pre-image of the value committed to.

The protocols disclosed can be used by assigning each T to a C, and letting the C's handle all communication with Z and W. Alternatively, T might be brought into connection with more than one C, and these C's might have fixed associations with particular W's and Z's. In this alternate configuration, T would maintain the data that C would have maintained in the other embodiment. A danger with this alternate configuration is that T might leak information to a W or Z. To detect such leaks, configurations are disclosed that allow false T's to test shared C's and also false shared C's that can test T's.

DETAILED DESCRIPTION OF PREFERRED EMBODIMENTS

While it is believed that the notation of the flowcharts in FIGS. 1-9 would be clear to those of ordinary skill in the art, it is first reviewed here for definiteness.

The operations performed are grouped together into flowchart boxes. The dotted line column enclosure that a box is in indicates which party performs the operations defined in that box. The columns are labeled by party name across the top: "T" for tamper resistant device, "C" for moderating computer, "W" for a party that accepts payment, and "Z" for a party that is able to issue signatures and increase the amount of money held by T.

One kind of operation is an equality test. The "?=?" symbol is used to indicate such a test, and the party conducting the test terminates the protocol if the equality does not hold. (If the test is the last operation to be performed by a party during a protocol, then the success or failure of the test determines the party's success or failure with the protocol).

Another kind of operation is that of sending a message. This is shown by a message number on the left; followed by a recipient name and an arrow (these appear for readability as either a recipient name then left pointing arrow, when the recipient is on the left; or right pointing arrow then recipient name, when the recipient is on the right); followed by a colon; finally followed by an expression denoting the actual value of the message that should be sent, shown using variables whose values are known to the sender. (These operations are depicted in a "bold" typeface for clarity.) Square brackets are used to delimit message numbers and such an expression stands for the value of the corresponding message.

The further operation of saving a value under a symbolic name is denoted by the symbolic name on the left hand side of an equal sign and an expression on the right hand side.

Several kinds of expressions are used. One is just the word "random." This indicates that a value is preferably chosen uniformly from an appropriate set of values defined in the text and independently of everything else in the protocol. Thus a party should preferably employ a physical random number generator for these purposes, possibly with appropriate post-processing. In practice, however, well known keyed and un-keyed cryptographic and pseudo-random techniques may be applied, possibly in combination with physical sources.

A further kind of expression involves exponentiation. All such exponentiation is in a finite group, say, for example, the multiplicative group modulo an RSA modulus M. When no operation is shown explicitly, multiplication in such a groups is assumed. When "/" is applied between elements of such a group, the result can be calculated by first computing the multiplicative inverse of the expression on the right and then multiplying it by the expression on the left—but this operation may also be described simply as division. When the "/" is used between exponents, and if the result is a proper fraction, it indicates a corresponding root, as is well known in the art.

Suitable RSA moduli have been proposed in "A method for obtaining digital signatures and public-key cryptosystems," by Rivest, Shamir and Adleman, *Communications of the ACM*, February 1978, pp. 120-126. For simplicity, concreteness, and clarity, and without loss of generality, all elements subject to exponentiation will be taken to be residues modulo the RSA modulus M of party Z, unless mentioned otherwise. The public exponents of party Z used in all the figures are taken for simplicity to be 3, although generalization to any other values would be obvious to those of skill in the art. Also for simplicity, as is common practice in the art, 3 will be assumed coprime with the order of the multiplicative groups used in the exponentiation The functions f and f* are public one-way functions taken to be "collision free" in the usual sense that is believed computationally difficult to find multiple pre-images that result in the same image. As would be obvious to those of skill in the art, it should be difficult to find any structure in these functions that can be related to the group or field structure of their images.

Another type of expression used in the exemplary embodiments relates to ordered sets of integers. For example, $\{1, \ldots, t\}$ denotes the set of integers from 1 to t inclusive in increasing order. Such sets may be combined with "-", the usual set difference operation, where the resulting order is fixed by some convention. Scalar addition with each element of a set is also defined. The set membership symbol "$\epsilon$" is used to let an index variable run over all the values in a set; thus, computations and messages involving an index variable are repeated for each value it takes on.

Figure 1:
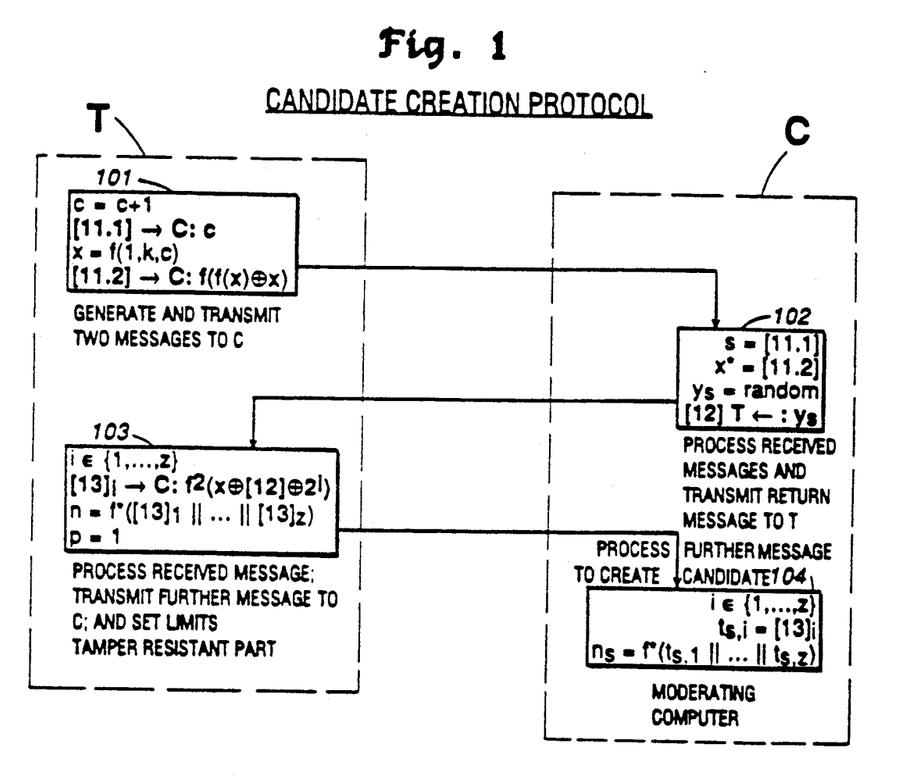
FIG. 1 shows a flowchart of a preferred embodiment of a candidate creation protocol performed between T and C in accordance with the teachings of the present invention.

Turning now to FIG. 1, the first part of a flowchart for the preferred embodiment will now be described in detail. It shows a candidate creation protocol performed between T and C.

Box 101 first shows T incrementing the variable c by 1. Some ultimate value for c could also be tested for so that T could ensure no c is re-used, and an initial value of say 0 could also be ensured, such testing and initialization being omitted for clarity. Any other way for T to obtain a value of c that has not, at least with high probability, been previously used would be equivalent. Examples that would be obvious to those of skill in the art might include generating c as part of a random or pseudo-random process, using a serial number as a parameter to a cryptographic function, or simply using names for the storage locations available to T. As per the notation already described, T then sends c as message [11.1] to C.

Nest T sets variable x to a value created by using c and secret key k as parameters to a cryptographic transformation, as indicated by application of the one-way function f to the triple 1, k, c. Such transformation might, for instance, be by means of DES or some other blockcipher. What is believed to be needed is a way for T to create a secret value corresponding to c, such that if this secret value becomes known to C, no other such secret for a different c could feasibly be determined by C. Thus the security of encryption function f shown is believed sufficient. Of course many other encryption possibilities would be essentially equivalent and obvious to those of skill in the art, such as encrypting c with k as key, or feeding both parameters into a recursive process like a stream cipher and extracting certain bits of the resulting outputs. Naturally x could also be chosen at random, but this would require that x be stored by T beyond the current flowchart, as x is re-used in FIG. 2 and FIG. 4. This storage and random number generation capability is believed to have some cost for a smart card or the like and is therefor preferably avoided.

Next, the public, one-way function f is applied to x, the result is exclusive-or'ed with x, and f applied before transmitting the result to C as message [11.2]. This serves as a way to commit T to x without revealing x to C. Again the particular transformation shown for developing the commit is for clarity in exposition, and many equivalent ways to accomplish a commit are widely known in the art, and include any one-way procedure taking at least x as a parameter, but also possibly including other public values as parameters. The particular choice made here uses the same f but the commit is believed never to be related to a value of message [13] described below.

Box 102 defines the actions of C after the above mentioned two messages are received from T. First the variable s is set to the value of message [11.1] for convenience in notation. A random value is created by C and saved in the variable $y_s$, where the first subscript indicates the value of message [11.1]. This value is chosen uniformly over the same domain as the variable x, which only for clarity are taken to be represented as bit strings of a fixed length. Message [12] containing the value $y_s$ is sent by C to T. Also C is shown saving the value of message [11.2] already described as x*. It should be noted that for clarity in exposition an "*" will be sued to distinguish related variable or functions from each other, but primes will be used to distinguish what should be separate copies of the same value maintained by different parties.

Box 103 described first the sending of z messages by T to C, with each message indexed by variable i ranging over the integers 1 to z. (It will be appreciated that z, as well as z* and z** to be described, are public constants; z being the total number of bits in the payment challenge to be described.) The i'th such message is formed as the image under double composition of f applied to the exclusive-or of three quantities. The first quantity is x, the second is message [12] received, and the third is taken for definiteness as two raised to the i power. The particular choice of including the parameter i is essentially arbitrary, though leaving the exponentiation out of this embodiment would raise some slight problems in FIG. 7, to be described. What is believed preferable for providing optimal unlinkability is that x and [12] are combined in such a way that if x is uniform, then the result is uniform. Variable n, used again in box 203 to be described, is assigned an image under the one-way function f*. This function preferably maps its argument to a residue modulo the RSA composite M, which is the public modulus whose factorization is accessible to Z, on which all the RSA computations shown are conducted. Naturally it is anticipated that multiple moduli will be used, possibly to reflect the type of payer or thing paid for or a validity interval. The argument for f* is taken as the concatenation of z values, message [13.1]$_i$, where the values of i are taken in increasing order for definiteness. It will be readily appreciated by those of ordinary skill in the art how the pre-image of f* can be of any size relative to its image. In particular, if z is taken to be, say, for instance, 16, and M has 512 bits, and each image of f is 64 bits, then f* will compress 2 to 1. Before completing the operations of this box, T sets variable p, which is initially 0, to the value 1, thereby enabling at most one of the transactions of FIGS. 2 and 3.

Box 104 is first the saving by C of message [13.1]$_i$ received as variable $t_{s,i}$, still for all i between 1 and z. Finally $n_s$ is formed here, for notational clarity only since it could also be formed at any later time, as f* applied to the concatenation of the $t_{s,i}$ just saved.

Figure 2:
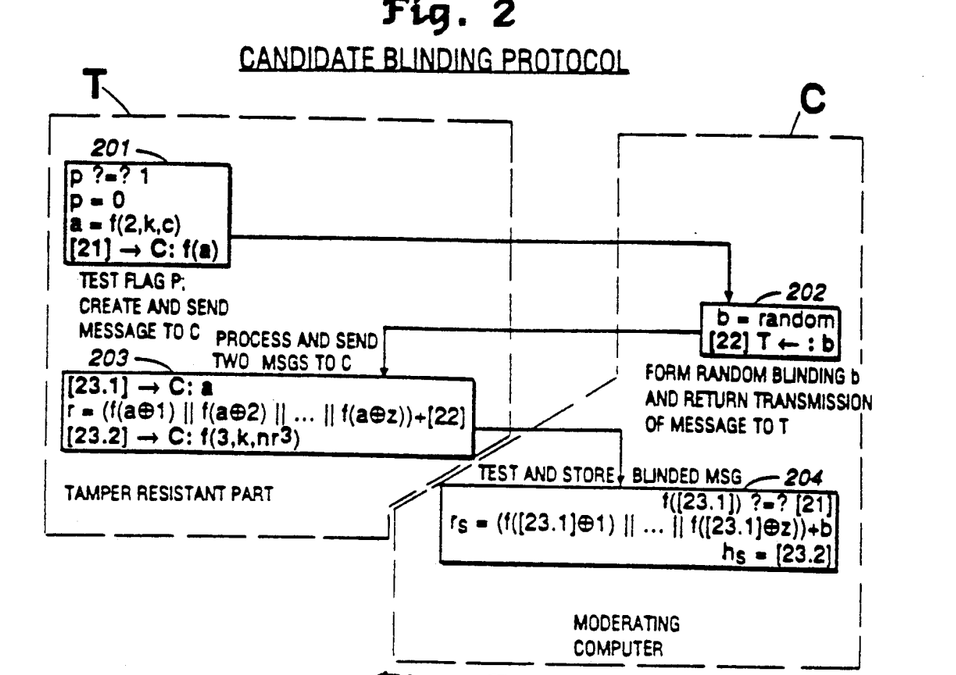
FIG. 2 shows a flowchart of a preferred embodiment of a candidate blinding protocol between T and C in accordance with the teachings of the present invention.

Turning now to FIG. 2, the second part of a flowchart for the preferred embodiment will now be described in detail. It shows a candidate blinding protocol between T and C.

Box 201 is first the testing of flag p set to 1 in box 103 already described: if the flag is 1, box 201 proceeds, if it is not, the protocol is aborted as already mentioned as being a consequence of a test failing. Assuming the flag was set, it is reset as shown by being assigned the value 0. Next a variable a is set to a cryptographic function, distinct from those of the other figures, as indicated by its first parameter being 2. The other parameters of the function are T's secret key k and the variable c both as already mentioned. One-way function f is applied to a, and the result is sent to C as message [21].

Box 202 details first the forming of a random blinding parameter b at random by C. This is preferably done uniformly over the resides modulo M. Message [22] is the sending of b to T.

Box 203 denotes first the sending of a by T to C as message [23.1]. Then variable r is computed as the sum of message [22] received and some function of a. For definiteness, this function has been chosen as the concatenation of images under f, where the pre-images are exclusive-or's of a with the integers between 1 and z. Any function of a, even possibly the identity, might be adequate here. But since it is believed that the result of the function is preferably of size comparable to M and to some extent complex, this particular expanding cryptographic function was chosen for simplicity as it is similar to other notations used herein. A further possibility, not shown for clarity, is that C could supply additional data that would be included in the calculation of r; this could be at least one challenge bit worth of "one-show blind signature" information as described in the second reference cited under description of prior art. Finally T prepares and sends an authenticator to C as message [23.2]. As already mentioned for boxes 201 and 101, the particular notation used for simplicity and clarity is that the first argument distinguishes the function from other functions, the second is the key k, and the third the value to be authenticated. This value is a residue modulo M, not indicated explicitly for clarity, such residues being very well known in the art. The residue is the product of variable n, given its value in box 103, and the cube of variable r. It is anticipated that this value might not be computed by T itself, but rather that T might check such a value supplied by C.

Box 204 discloses first the verifying of message [23.1] received by applying f to it and testing that the result is equal to message [21] received. Next $r_s$ is set to a value computed as r was computed in box 203 just described: the value b is added modulo M to the result of concatenating images under f of an index running between 1 and z x-or'ed with message [23.1]. A second variable, $h_s$, is set to the value of message [23.2] received.

Figure 3:
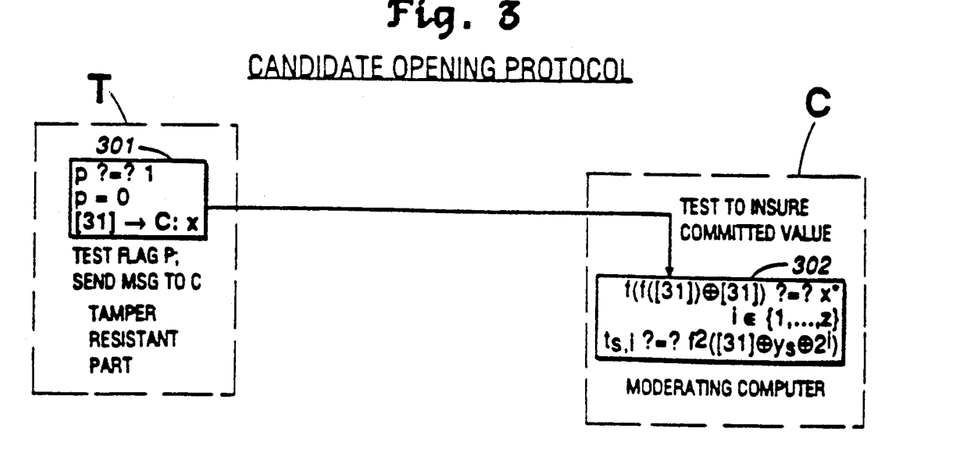
FIG. 3 shows a flowchart of a preferred embodiment of a candidate opening protocol between T and C in accordance with the teachings of the present invention.

Turning now to FIG. 3, the third part of a flowchart for the preferred embodiment will now be described in detail. It shows a candidate opening protocol between T and C.

Box 301 formalizes first the testing of flag p for equality with 1 and then the setting of it to 0, just as described for box 201. Then message [31] is sent to C with content x.

Box 302 portrays first the testing of message [31] to ensure that it is the value committed to by T in box 101. On the left of the equality test is the image under f of an exclusive-or of message [31] received and the image under f of message [31]. The right-hand-side is $x^*$. Provided the test is satisfied, as always, index variable i is allowed to range over the values between 1 and z. For each value the equality of $t_{s,i}$ with a double application of f is tested. The argument for f is the exclusive-or of message [31], $y_s$, and $2^i$.

Figure 4:
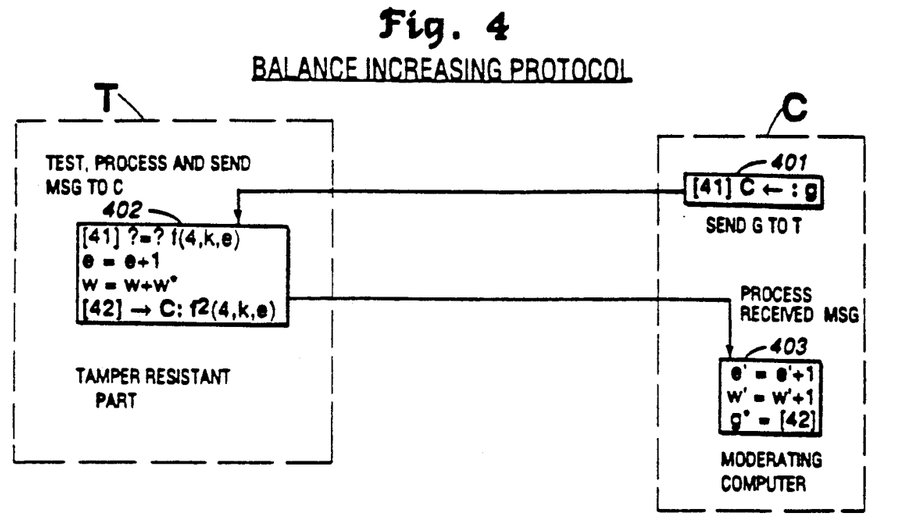
FIG. 4 shows a flowchart of a preferred embodiment of a balance increasing protocol between T and C in accordance with the teachings of the present invention.

Turning now to FIG. 4, the fourth part of a flowchart for the preferred embodiment will now be described in detail. It shows a balance increasing protocol between T and C.

Box 401 is the sending of g, which will be described more fully with reference to box 503, from C to T as message [41].

Box 402 discloses first the testing of message [41] received for equality with the image under f of the triple 4, k, e. Next counter e is incremented by one. Then w is shown being incremented by the amount $w^*$ of money withdrawn. And then T sends C message [42] containing the double application of f to the triple 4,k,e.

Box 403 first has C increment by one its copy of the counter e'. Then w' is incremented by $w^*$ as already described for ox 402. After this $g^*$ is set to the value of message [42] received.

Figure 5:
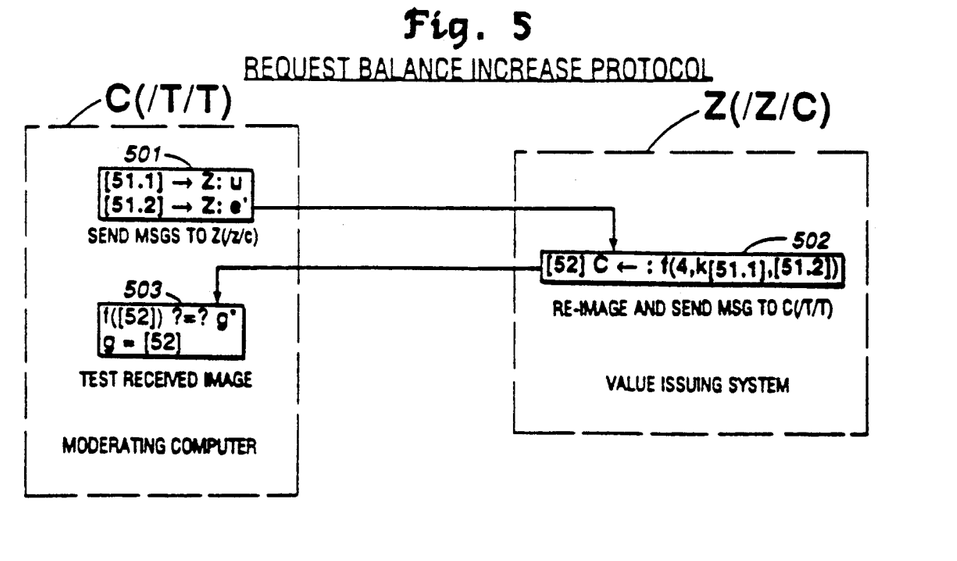
FIG. 5 shows a flowchart of a preferred embodiment of a request balance increase protocol between C and Z in accordance with the teachings of the present invention.

Turning now to FIG. 5, the fifth part of a flowchart for the preferred embodiment will now be described in detail. It shows a request balance increase protocol between C and Z. The notation at the tops of the two columns of boxes is intended to indicate, as will be appreciated, additional configurations under which at least the essential content of the protocol can be conducted. Accordingly, FIG. 5 also shows a protocol between T and Z as well as a protocol between T and C. Such alternate configurations to be described further with reference to FIG. 10.

Box 501 determines the sending of quantities u and e' from C to Z as messages [51.5] and [51.2], respectively. For clarity in exposition the alternate two configurations of parties who could employ this protocol are not mentioned in this detailed description, since appropriate renaming of parties, messages, and variables, would be obvious to those of skill in the art.

Box 502 shows Z sending message [52] to C after forming it as an image under f. The first argument of f is the integer constant 4. The second argument is the collection of keys k, distinct from the scalar k of T because it appears subscripted, which is subscripted by message [51.1] received. In practice the well known technique of encrypting u under a master key to create k might be employed, as would be obvious. The third argument is message [51.2] received.

Box 503 portrays first the testing of the image under f of message [52] received for equality with $g^*$ as retained from box 403 already mentioned. Then g is assigned the value of message [52] received. This is the value of g that is referenced in box 401 already described.

Figure 6:
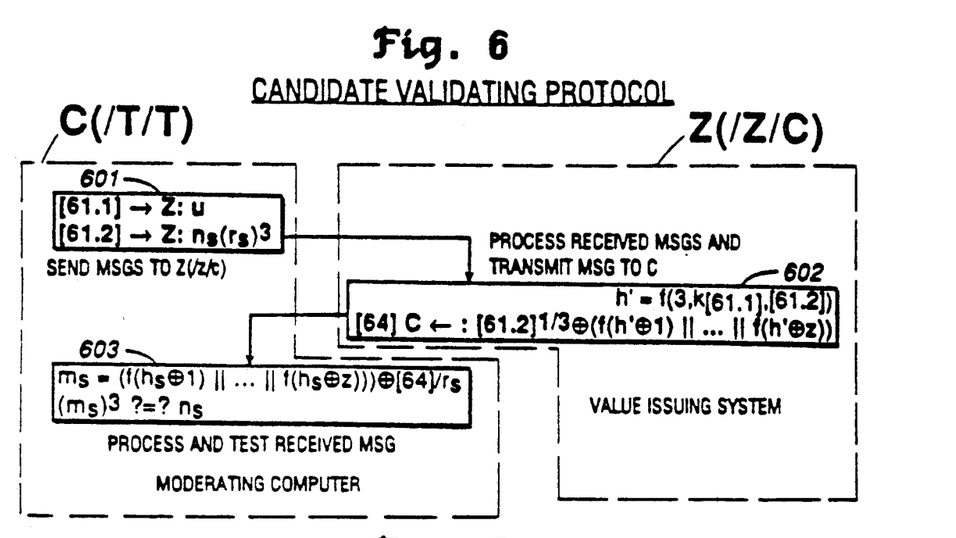
FIG. 6 shows a flowchart of a preferred embodiment of a candidate validating protocol between C and Z in accordance with the teachings of the present invention.

Turning now to FIG. 6, the sixth part of a flowchart for the preferred embodiment will now be described in detail. It shows a candidate validating protocol between C and Z. As already mentioned with reference to FIG. 5, notation at the column tops indicates additional configurations under which at least the essential content of the protocol can be conducted. Accordingly, FIG. 6 also shows a protocol between T and Z as well as a protocol between T and C.

Box 601 determines first that u is transferred by C to Z as message [61.1]. The value of u could be hidden in transmission by, for example, encrypting it with the public key of Z, but this is not shown for clarity. The other parties who could conduct this protocol, as already mentioned, are for clarity not referenced explicitly. The other operation is sending message [61.2] to Z. It contains the product modulo M of $r_s$ cubed times $n_s$.

Box 602 first sets h' equal to f applied to three arguments: the constant 3, the key determined from the master key list k according to index message [61.1] received; and message [61.2] received. The other operation is sending message [64] to C. Its value is the third root modulo M of message [61.2] received exclusive-or'ed with a quantity derived by concatenating z images under f, where the i'th such image is the ex-or of h' and i. Related to the possibility indicated with reference to box 203 of including a "one-show blind signature" part in r, at this point Z might additionally request that C open this part so that Z can verify that it was properly formed; only checks for which such parts are not opened at this point would preferably be used in payment later.

Box 603 depicts message [64] received by C being first divided by $r_s$ and then the result ex-or'ed with a quantity derived from $h_s$ exactly as h' was expanded in box 602. The expansion is f applied to $h_s$ x-or i for i between 1 and z, with the results concatenated. A test is then made to ensure that $m_s$ cubed is equal to $n_s$, which confirms the signature issued by Z.

Figure 7:
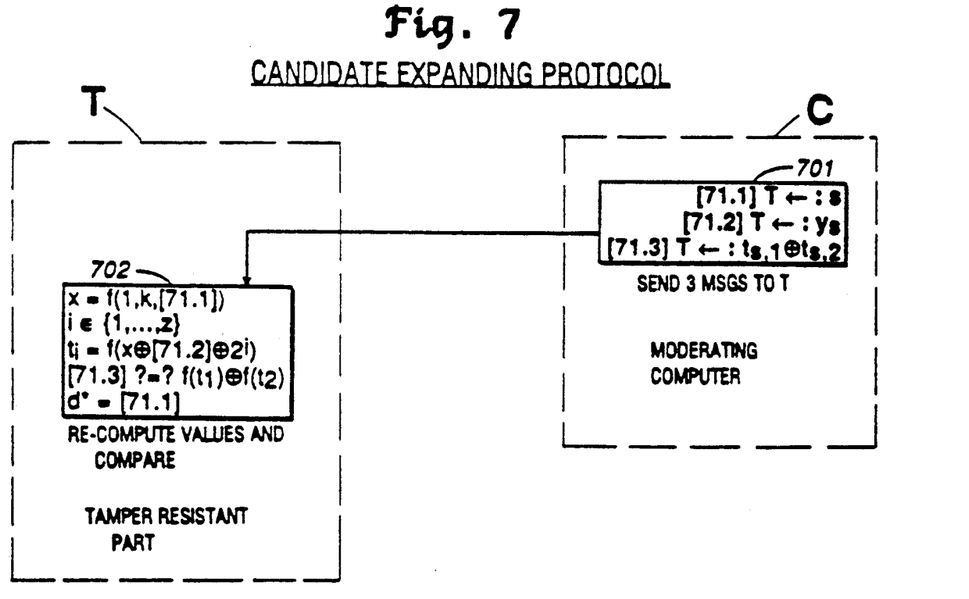
FIG. 7 shows a flowchart of a preferred embodiment of a candidate expanding protocol between T and C in accordance with the teachings of the present invention.

Turning now to FIG. 7, the seventh part of a flowchart for the preferred embodiment will now be described in detail. It shows a candidate expanding protocol between T and C.

Box 701 sends three messages from C to T. The first is [71.1] and it contains s. Second is [71.2] containing $y_s$. And third [71.3] is the x-or of $t_{s,1}$ and $t_{s,2}$.

Box 702 has T re-compute what should be the same value of x as in the corresponding instance of box 101: the image under f of 1, k, and message [71.1] received. Next, for each i between 1 and z, $t_i$ obtains the value of f applied to the exclusive-or of three values: x, message [71.2] received, and $2^i$. After this, message [71.3] received is tested for equality with the exclusive-or of the image under f of $t_1$ and f of $t_2$. Counter $d^*$ is then set to the value received as message [71.1].

Figure 8:
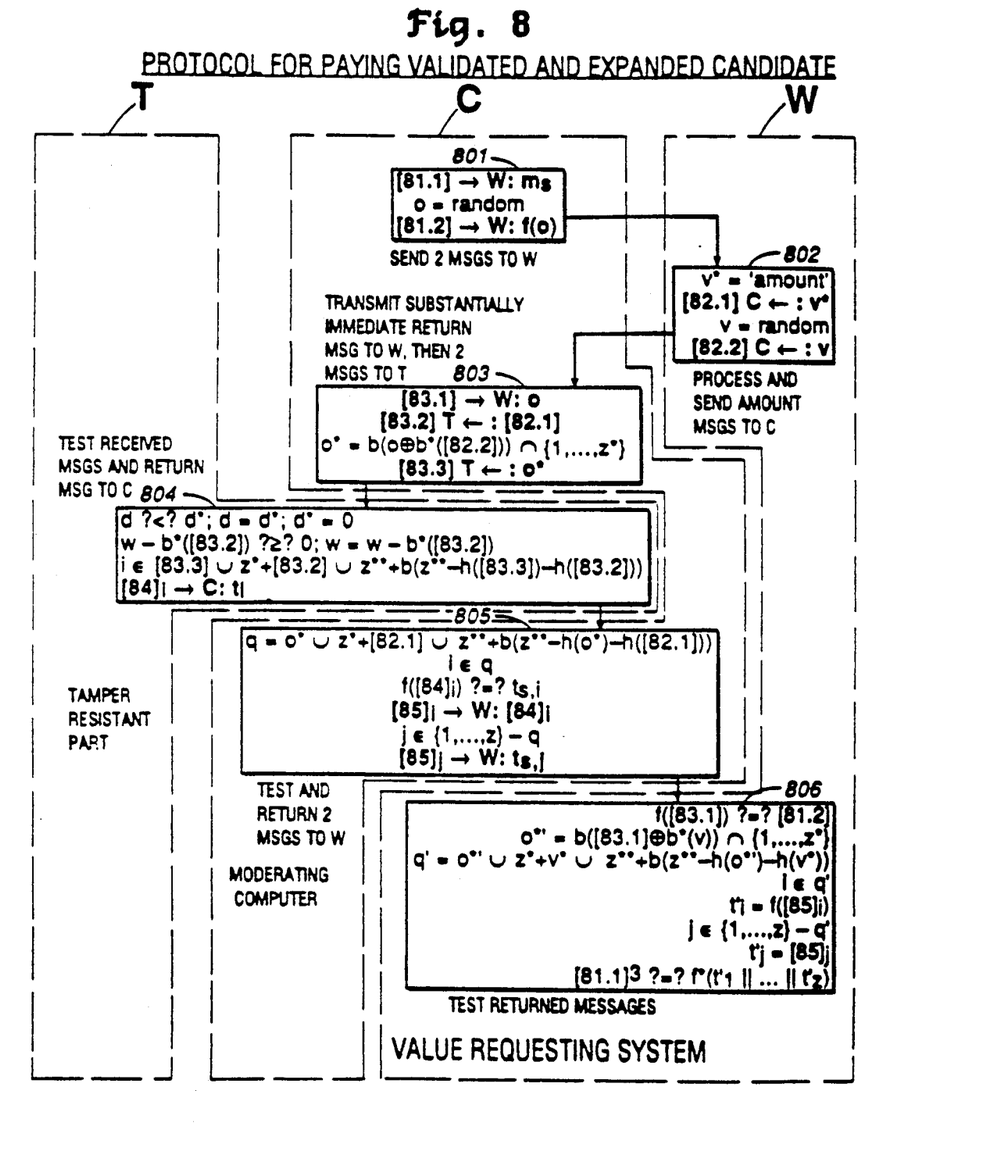
FIG. 8 shows a flowchart of a preferred embodiment of a protocol for paying a validated and expanded candidate between T, C and W in accordance with the teachings of the present invention.

Turning now to FIG. 8, the eight part of a flowchart for the preferred embodiment will now be described in detail. It shows a protocol for paying a validated and expanded candidate between T, C and W.

Box 801 specified that C send $m^s$ to W as message [81.1]. Then o is chosen uniformly at random from some subset of the integers. It is believed that this set need only be large enough to make guessing o unlikely during the duration of the protocol, in which case 64 bits would be more than adequate. Then C sends the image under f of o to W as message [81.2]. Alternate ways to achieve the same effect as o and message [81.2], not described here for clarity, are to send only part of $m_s$ in box 801 (which serves as a commitment like f(o)) and in box 803 to send the rest of $m_s$ to W (which serves, in addition to its primary function, like o).

Box 802 shows W first setting $v^*$ to a set of integers between 1 and the constant $z^{**} - z^*$. The constant z has already been mentioned; $z^* < z^{**}$ ($< z$) are also integers and they are the index of the l.s.b. of the non-amount part of the challenge and l.s.b. of the amount of payment, respectively. The amount is assigned to variable $v^*$ as indicated by the notation 'amount'. The coding used to represent it is such that for all integers i in the set $v^*$, $2^{i-1}$ is included in the sum making up the value of $v^*$. Thus the cardinality of $v^*$ is the hamming weight of the binary representation of the amount and this representation is used for all the sets in this figure. The amount $v^*$ may be arrived at by people involved in the payment or by some automatic means, but the details of how it is determined are not essential. An example from a road pricing application would be that the amount is a function at least partly depending on the time of day, day of week, class of vehicle, road conditions, or possibly even route information. Message [82.1] sends $v^*$ to C. The set of integers, with elements between 1 and the constant $z^*$, serving as the non-amount part of the challenge v is shown as created at random and then sent to C as message [82.2]. As will readily be appreciated, part or even all of this part of the challenge might also be a function of the particular W involved or a time sequence number, for example.

Box 803 begins by C sending o to W i message [83.1]. This transmission is preferably synchronously exchanged, bit by bit, for at least part of messages [82.1] and/or [82.2] and possibly other details related to the payment. The precise timing of such exchanges is believed capable of placing an upper bound on the distance between W and C. This may be desirable in a road pricing application, for instance, where drivers passing W may establish a communication link from W to a distant victim C. Because set notation is used for clarity herein to represent some binary strings as already mentioned, two functions b and $b^*$, which are inverses of each other, will be used. Function b takes an integer into the set of integers labeling the digit positions that hold 1's in the binary representation of the argument, which is the representation already described for $v^*$ in box 802; $b^*$ takes a set of integers and converts it to a single integer by summing two raised to each integer minus one in the set. For example, $b(5) = \{1,3\}$ and $b^*(\{5,1\}) = 17$. Next $o^*$ is assigned a value that is a subset of the integers between 1 and $z^*$, as indicated by intersecting a first set with a second set containing the integers between 1 and $z^*$. The first set is formed as b applied to the exclusive-or between a value o and $b^*$ applied to message [82.2] received. Notice that this technique also allows, in some embodiments, that the size of v or $v^*$ exceed what can be represented by z digits. The value of $o^*$ is then transmitted to T as message [83.3].

Box 804 depicts T first testing that $d^*$ is strictly larger than d, which is believed to be one way to prevent the same expanded candidate from being paid with different challenge or amount. When this test succeeds, d is set to $d^*$ and $d^*$ is set to 0. Next message [83.2] received, which is a set of integers as already described, is converted by the function $b^*$ to the integer amount that it represents. This integer amount is subtracted from the current balance of T, denoted w, and it is tested that the result is non-negative. When this succeeds, w is decremented by this amount. Next index i is allowed to range over the values in a set which is computed as the union of three sets. The first set is message [83.3] received. The second set is the scalar sum of constant $z^*$ with the set contained in message [83.2]. The third set is also a scalar sum but between $z^{}$ and a set that is the result of applying b. The argument of b is the sum of $z^{}$, the additive inverse of the hamming weight of message [83.3], and the additive inverse of the hamming weight of message [83.2]. For each such i, message [84]$_i$ is sent C with content $t_i$.

Box 805 includes C assigning a set to variable q that it is believed should be the same as the set over which i ranged in box 804. It is the union of three sets: $o^*, z^*$ added to each component of message [82.1], and $z^{}$ added to the image under b of $z^{}$ minus the sum of the hamming weights of $o^*$ and message [82.1]. For each i in q, the image under f of message [84]$_i$ received is tested for equality with $t_{s,i}$. Message [85]$_i$, whose value is simply that of message [84]$_i$, is sent to W. Of course it is preferable that all values are tested before they are sent, but some applications may have advantage from sending some or all values before they are tested and possibly testing them later. For each j not in q, message [85]$_j$ is sent containing $t_{s,j}$. If C were not to store these last values, then they could as would be obvious be obtained form T; some test on a saved "hash" of them might be made by C once they are again computable.

Box 806 tests in its first operation equality between the image under f of message [83.1] received from box 803 and message [81.2] received from box 801. Then $o^{*'}$ is set to the intersection of the set containing the integers 1 up to $z^*$ with an image under b. The argument of b is an exclusive-or of two terms: the image under $b^*$ of v from box 802 already mentioned; and message [83.1] received from box 803. Next q' is computed, in essentially the same way as already described for q in box 805, as the union of three sets. One set is $o^{*'}$ just described, another is the sum of scalar $z^*$ with each element in set $v^*$ from box 802. The final set is again the image under b of constant $z^{**}$ minus the hamming weight of $o^{*'}$ and minus the hamming weight of $v^*$. For each i in q', $t'_i$ is set to f applied to message [85]$_i$; for each j in the complement of q', $t'_j$ is set to [85]$_j$. Then the final test of the money received is carried out: message [81.1] received from box 801 is cubed modulo M and the result is compared for equality with $f^*$ applied to the concatenation of $t'_1$ up to $t'_z$.

Figure 9:
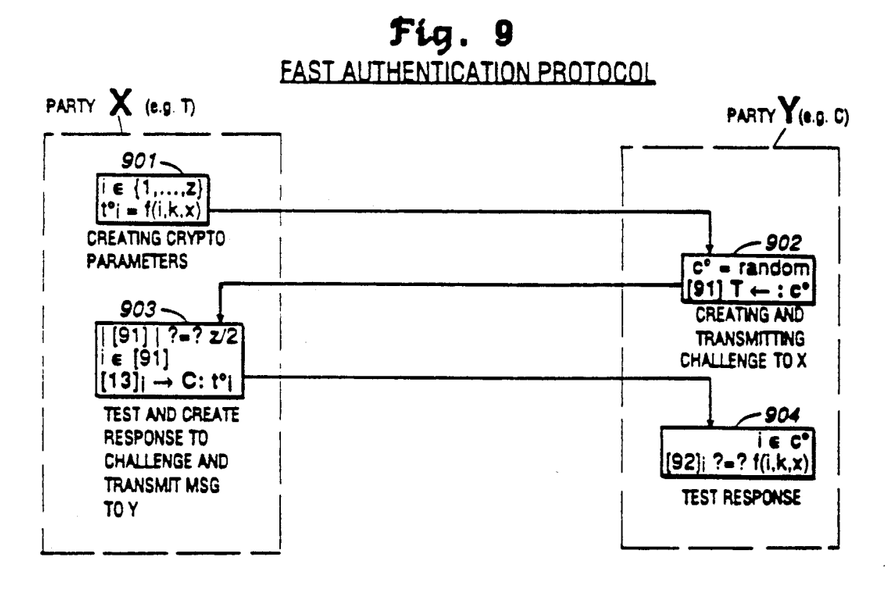
FIG. 9 shows a flowchart of a preferred embodiment of a generic fast authentication protocol between party X and party Y in accordance with the teachings of the present invention.

Turning now to FIG. 9, the ninth part of a flowchart for the preferred embodiment will now be described in detail. It shows a generic fast authentication protocol between party X and party Y.

Box 901 starts by forming $x^o$ at random. Next X lets i range between 1 and z inclusive. The parameter z could be, to give an illustrative example, in the range 1 to 16 for the case of a commit (to be described below) and without a commit, 32 to 128. Then for each i, X creates a value $t^o{}_i$ as a cryptographic function f with three parameter arguments: index i, secret key k shared between X and Y, and the value $x^o$. As will be appreciated, a single block-cipher application for instance could create all the images under f by simply defining the role of parameter i as selecting the i'th bit of the output block.

Box 902 is the creation of a random challenge $c^o$ by Y. In the exemplary embodiment shown, $c^o$ is a subset of the integers between 1 and z inclusive which contains exactly z/2 signatures (assuming for clarity of course that z is even). A further restriction with some implementation advantages would be where $c^o$ selects exactly one member of each of a fixed set of pairs of integers, such as pairs of the form 2j, 2j+1. Other codings to prevent subsets of a valid challenge from being themselves valid challenges have already been described with reference to FIG. 8, and the use in either place of any such coding known in the art should be considered to be within the scope of the present invention. At a certain moment Y may decide to issue the prepared challenge $c^o$ to some party X, by sending it in message [92]. As already indicated with reference to FIG. 8, it may be desirable to obtain part of or a commitment to the particular instance that party X should respond to before the challenge is at least completely issued. Here it is shown that this is not necessary, although it may make somewhat less efficient use of the challenge information (as has already been suggested with reference to box 901).

Box 903 depicts X's response to the challenge message [92] received. First X issues $x^o$ retained from box 901 already described. Then X checks the cardinality of the set of integers in message [92] to ensure that it is exactly half z. Next i is let range over the set of integers in message [92] and $t^o{}_i$ is sent Y as message [93.2]$_i$.

Box 904 tests the response Y receives by, for each i in $c^o$, forming the image under f of the argument triple i,k, and message [93.1] received and comparing it for equality with message [93.2]$_i$ received.

As will be appreciated, a variant of the embodiment of FIGS. 1 through 8 could use the approach disclosed in FIG. 9 in place of the set of one-way functions, provided that a common secret key is available for creating and checking such authentication. As will be appreciated further, this ultra-fast challenge and response protocol may have much wider and quite general applicability for authentication using conventional cryptography.

Figure 10A:
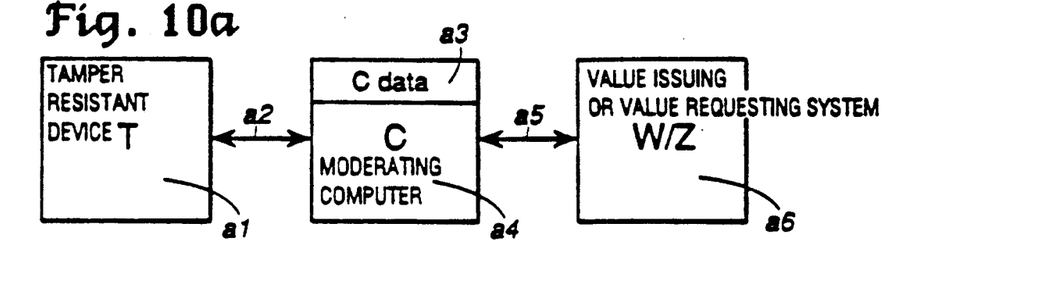
FIG. 10a shows a block diagram of a preferred moderated embodiment of the protocols of FIGS. 1-8 in accordance with the teachings of the present invention.

Turning now to FIG. 10a, the first of three block diagrams for embodiments of the present invention will now be described in details. It shows one configuration in which any of the transactions of FIGS. 1-8 could be conducted.

Box a1 is a tamper-resistant device T. It communicates by link a2 with device a4 having inter-transaction data storage area a3 that is shown for comparison with FIGS. 10b and 10c to be described. The connection a2 between a1 and a4 might be physically established at time of manufacture; in this first case, for instance, T could be a security microprocessor chip soldered to a substrate also holding the components(s) of a4. Alternatively, a1 could be physically detachable from a4. In this second case, a1 might be a smart card, as are well known in the art, and interface a2 could be of a type specific to such cards. Another possibility would be for a1 to be a small module that could easily be completely inserted within a4 and later removed. Processor C has interface a5 to external entities indicated collectively as W/Z in box a6.

All the flowcharts of FIG. 1 through FIG. 8 could be interpreted as being conducted by apparatus having the same party name labeling and configured as shown in this block diagram.

Figure 10B:
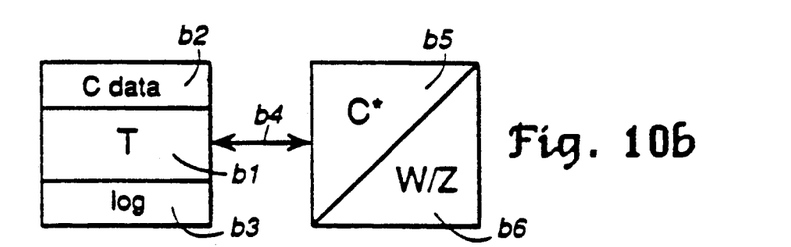
FIG. 10b shows a block diagram of a preferred unmoderated embodiment of the protocols of FIGS. 1-8 in accordance with the teachings of the present invention.

Turning now to FIG 10b, the second of three block diagrams of embodiments of the present invention will now be described in detail. It shows an alternate configuration in which any of the transactions of FIGS. 1-8 could also be conducted.

Box b1 contains the same functions as T of the other figures. Box b2 is extra data stored by T that could also have been stored in memory associated with C, as has already been illustrated by the box a3. Box b3 is a log maintained by T used to record the details of all accesses to data b2.

Not shown for clarity is an optional physical timer, such as a leaky capacitor, that allows T to prevent more than one transaction being conducted in rapid succession, even if the power is removed from T.

A PIN code or other authentication could be required by T before access to data b2 (or b3) is allowed. One example would be a digital signature issued by C*, to be described, responsive to a challenge created by T. The signature might also include information about the details of the transaction; T could store the signature and/or only allow a transaction in conformance with these details. The public key of the signature might be known to T, or C* might also be required to show a so called public-key certificate issued by some authority known to T. Hierarchies of certificates and such authorities are also well know in the art.

Link b4 connects box b1 with box half b5. This link might be a standard smart-card interface, for example. Box b5 is shown as C* because it performs the functions of C but using data storage b2 for data that must be maintained between transactions. Such data are, in the exemplary embodiments, all the variables assigned to a value in one of FIGS. 1-8 that are referenced in any other one of FIGS. 1-8. For example, variable $t_{s,i}$ from FIG. 1 is preferably retained until payment in FIG. 8; variable $y_s$ from FIG. 1 is called for again in the expansion of FIG. 7, although such use could be avoided in some embodiments where it is taken as a constant; variable $h_s$ from the blinding in FIG. 2 is refined for use in the withdrawal of FIG. 6; and variable $m_s$ from FIG. 6 is of course needed in FIG. 8. Box half b6, contains the external entities indicated collectively as W/Z. Box halves b5 and b6 are depicted as triangular halves of the same box to indicate that they may be a single W or Z party or device as already described in detail, but with a C* style interface to T. For example, a point-of-sale or other payment location may be equipped to receive a smart cart T and to serve as its C* by using the data b2 and the usual C interface; the location might, possibly in the same computer, play the role of W to receive payment from C. Similarly, for the transactions involving Z, a card may be inserted into a public terminal and interface to it in essentially the same way as it would to C*. Value increase would be communicated directly to T, but signatures $m_s$ normally maintained by C would be stored in data storage area b2, so that payment could later be made by any C* device into which T is inserted.

In an application where both the configuration of FIGS. 10a and 10b are used, C's might be adapted to cooperate by, for example, storing check signatures in b2 so that they could be used by a C*, and also by being able to spend check signatures stored in b2, if needed.

Figure 10C:
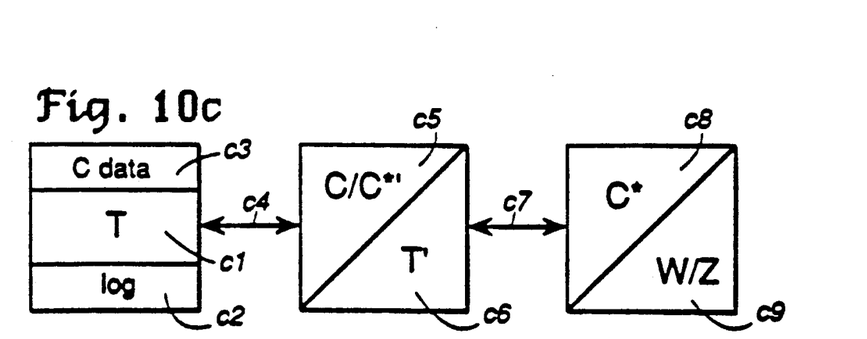
FIG. 10c shows a block diagram of a alternate unmoderated testing embodiments of the protocols of FIGS. 1-8 in accordance with the teachings of the present invention.

Turning now to FIG. 10c, the third of three block diagrams of embodiments of the present invention will now be described in detail. Shown are alternate configurations in which any of the transactions of FIGS. 1-8 could be conducted in order to detect improper functioning of T or C*.

Box parts c1, c2, and c3 are the same as parts of FIG. 10b: tamper-resistant part T, optional data storage for C that is maintained by T, and optional log also maintained by T of accesses to the data storage, respectively. Similarly, c4 is interface means of the type used between a T and a C (in which case c2 and c3 are not needed) or between a T and a C*.

Box half c5 is shown as either C or C*', the same box half being used for clarity. When c5 is C, then the purpose of the configuration is to obtain data to be used by box half c6 to be described. When it is a C*', then the purpose is to try to catch c1 performing improperly, such as not logging certain transactions or improperly allowing outflow of certain data.

Box half c6 is shown as containing a T', which is intended to depict a false T that is used to detect improper functioning of a C*. Such a T' would of course also have data and log storage, not shown for clarity. It is not tamper-resistant against its holder, and so can be programmed with data and instructions allowing it to emulate a proper T. Examples of such data are messages [61.2] for a withdrawal, and various $t_i$ for a payment. Not including the hamming weight of the amount part [83.2]/[82.1] in the computation of set q in a payment means that T' can make a payment even when not connected to a C or T. (To facilitate this, Z could accept a refund request for the unspent value of a check if the unspent $t_i$ are provided.) But if C* were to send an improper signal, one for example that might be intended to cause an improper function of T, as mentioned above, T' would record this improper event and C* would be caught. Link c7 depicts an interface between T' and a C*, which is shown as box half c8. As with b5 and b6 already described, C* shares a box with some W or Z collectively indicated as box half c9.

As would be obvious to those of ordinary skill in the art, there are many essentially equivalent orders to evaluate expressions; ways to evaluate expressions; ways to order expressions, tests and transmissions within flowchart boxes; ways to group operations into flowchart boxes; and ways to order flowchart boxes. The particular choices that have been made here are merely for clarity in exposition and are sometimes arbitrary. Notice, for example, that whether a signature is first tested in blinded form and then unblinded or unblinded and then tested, as shown for clarity here, is quite unessential. Also, for example, the order in which messages are generated within a box and sent may be of little or no significance.

It will also be obvious to those of ordinary skill in the art how parts of the inventive concepts and protocols herein disclosed can be used to advantage without necessitating the complete preferred embodiment. This may be more fully appreciated in light of some examples. Naturally the protocol of FIG. 9 is of quite general utility, and need not be associated with any of the other protocols shown, although it could be used in a conventional cryptographic version of the other protocols. Similarly the configuration of FIGS. 10b and 10c are of general applicability to any kind of smart card system that is also able to work with personal smart card readers. Furthermore, the inflow and outflow protection techniques disclosed in FIGS. 1—3 could be applied in many other contexts. The mirror attack protection of FIG. 8 could be omitted from the preferred embodiments, or it could be employed in quite other applications.

Certain variations and substitutions may be apparent to those of ordinary skill in the art. For example, multiple public exponents and devaluing could be applied instead of the $t_i$. The radix two is used for clarity in the formation of the $t_{si}$ and the challenge set q of FIG. 8. Of course any other radix could be used by letting $t_{si}$ be the application of f to $t_i$ a number of times equal to 1 plus the radix. The number-of-zeros coding used to prevent modification of the payment challenge q is readily adapted to higher radix simply by taking the sum of the inverses of the digits. Any of the other well known coding technique having the property that reducing any digit(s) of a codeword cannot produce another codeword could of course be used.

While these descriptions of the present invention have been given as examples, it will be appreciated by those of ordinary skill in the art that various modifications, alternate configurations and equivalents may be employed without departing from the spirit and scope of the present invention.

What is claimed is:

1. In a cryptographic authentication method for use between a first party and a second party that share a common secret key, the improvement comprising the steps of:

creating by said first party a first value;

applying a cryptographic transformation, based on said secret key, to said first value to produce a set of values by said first party and said first party storing the set of values;

creating a challenge value by a second party and supplying the challenge value to said first party after said cryptographic transformation has been applied by said first party;

selecting an allowed subset of said stored set of values by said first party, said subset being determined by said challenge;

transferring said selected subset of values by said first party to said second party;

re-computing said subset of values by said second party using said secret key and said first values and said cryptographic transformation;

comparing for equality by said second party of said subset of values received with said subset of values re-computed.

2. In the method of claim 1, said set of values being bits resulting from the application of a block cipher using said secret key as key input and said value as data input.

3. In the method of claim 1, said allowed subsets having a predetermined cardinality.

4. In the method of claim 1, said allowed subsets chosen such that no allowed subset contains another allowed subset.

5. In the method of claim 1, choosing said challenge by said second party to contain an amount part and a random part.

6. In the method of claim 1, transferring said first value from said first party to said second party before transferring said challenge from said second party to said first party.

7. In the method of claim 1, transferring a commitment to said first value from said first party to said second party before transferring said challenge from aid second party to said first party.

8. In the method of claim 1, transferring said first value from said first party to said second party after transferring said challenge from said second party to said first party.

* * * * *